United States Patent
Hirth et al.

(10) Patent No.: US 9,540,978 B2
(45) Date of Patent: Jan. 10, 2017

(54) HONEYCOMB BODY FOR EXHAUST-GAS AFTERTREATMENT, METHOD FOR PRODUCING A HONEYCOMB BODY AND MOTOR VEHICLE HAVING A HONEYCOMB BODY

(71) Applicant: EMITEC GESELLSCHAFT FUER EMISSIONSTECHNOLOGIE MBH, Lohmar (DE)

(72) Inventors: Peter Hirth, Roesrath (DE); Holger Stock, Lohmar (DE); Rolf Brueck, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/481,276

(22) Filed: Sep. 9, 2014

(65) Prior Publication Data

US 2014/0373513 A1     Dec. 25, 2014

Related U.S. Application Data

(63) Continuation of application No. PCT/EP2013/054536, filed on Mar. 6, 2013.

(30) Foreign Application Priority Data

Mar. 9, 2012 (DE) .......................... 10 2012 004 918

(51) Int. Cl.
*F01N 3/00* (2006.01)
*F01N 3/035* (2006.01)
(Continued)

(52) U.S. Cl.
CPC .............. *F01N 3/035* (2013.01); *B01D 53/94* (2013.01); *F01N 3/0222* (2013.01); *F01N 3/281* (2013.01);
(Continued)

(58) Field of Classification Search
CPC ........ F01N 3/281; F01N 3/0222; F01N 3/035; F01N 2330/02; F01N 2330/04; B01D 43/94
(Continued)

(56) References Cited

U.S. PATENT DOCUMENTS

| 5,102,743 A | 4/1992 | Maus et al. |
| 5,436,216 A | 7/1995 | Toyao et al. |

(Continued)

FOREIGN PATENT DOCUMENTS

| CN | 101198405 A | 6/2008 |
| CN | 101268261 A | 9/2008 |

(Continued)

*Primary Examiner* — Audrey K Bradley
*Assistant Examiner* — Kelsey Stanek
(74) *Attorney, Agent, or Firm* — Laurence A. Greenberg; Werner H. Stemer; Ralph E. Locher (57) ABSTRACT

A honeycomb body for exhaust gas aftertreatment includes a first end face, a second end face, a central axis that penetrates the two end faces and a length. The honeycomb body has at least one at least partially structured metallic layer which is disposed about the central axis. A structure of the at least one metallic layer has elevations and depressions which extend at least over part of the length of the honeycomb body and run obliquely to the central axis. At least one metallic connecting strip is provided between adjacent regions of the at least one metallic layer. The metallic connecting strip is shorter than the length of the honeycomb body and forms a brazed connection or welded connection to the adjacent regions. A method for producing such a honeycomb body and a motor vehicle having the honeycomb body are also provided.

17 Claims, 3 Drawing Sheets

(51) Int. Cl.
   *F01N 3/28* (2006.01)
   *B01D 53/94* (2006.01)
   *F01N 3/022* (2006.01)

(52) U.S. Cl.
   CPC ........ *F01N 2330/02* (2013.01); *F01N 2330/04* (2013.01); *F01N 2450/22* (2013.01); *Y10T 29/49345* (2015.01)

(58) Field of Classification Search
   USPC .................. 60/297, 311; 29/890; 422/180
   See application file for complete search history.

(56) References Cited

U.S. PATENT DOCUMENTS

| | | | |
|---|---|---|---|
| 5,582,805 | A | 12/1996 | Yoshizaki et al. |
| 7,229,598 | B2 | 6/2007 | Takahashi et al. |
| 7,347,042 | B2 | 3/2008 | Brück et al. |
| 7,666,520 | B2 | 2/2010 | Wieres et al. |
| 7,789,947 | B2 | 9/2010 | Hodgson |
| 8,173,268 | B2 | 5/2012 | Maus et al. |
| 2002/0081245 | A1 * | 6/2002 | Nakamori ............ B23K 26/20 422/180 |
| 2011/0104016 | A1 | 5/2011 | Brück et al. |
| 2011/0120069 | A1 * | 5/2011 | Maus ..................... F01N 3/281 55/521 |

FOREIGN PATENT DOCUMENTS

| | | | |
|---|---|---|---|
| CN | 102089507 A | 6/2011 | |
| DE | 3312944 A1 * | 10/1984 | ............ F01N 3/281 |
| DE | 19611396 A1 | 9/1997 | |
| DE | 102005045492 A1 | 3/2007 | |
| DE | 102008011262 A1 | 9/2009 | |
| DE | 102008022518 A1 | 11/2009 | |
| DE | 102008025593 A1 * | 12/2009 | ............ F01N 3/281 |
| EP | 0613997 A1 | 9/1994 | |
| EP | 0988892 A1 | 3/2000 | |
| JP | H06254411 A | 9/1994 | |
| JP | 2003322017 A | 11/2003 | |
| RU | 2316656 C2 | 2/2008 | |
| RU | 1838640 A3 | 7/2010 | |

* cited by examiner

HONEYCOMB BODY FOR EXHAUST-GAS AFTERTREATMENT, METHOD FOR PRODUCING A HONEYCOMB BODY AND MOTOR VEHICLE HAVING A HONEYCOMB BODY

CROSS-REFERENCE TO RELATED APPLICATION

This is a continuation, under 35 U.S.C. §120, of copending International Application No. PCT/EP2013/054536, filed Mar. 6, 2013, which designated the United States; this application also claims the priority, under 35 U.S.C. §119, of German Patent Application DE 10 2012 004 918.8, filed Mar. 9, 2012; the prior applications are herewith incorporated by reference in their entirety.

BACKGROUND OF THE INVENTION

Field of the Invention

The present invention relates to a honeycomb body for exhaust-gas aftertreatment, such as is used, in particular, as a catalyst carrier or substrate body in exhaust systems of mobile internal combustion engines. A honeycomb body of that type provides, in particular, a large surface area on which catalytically active material is positioned and brought into contact with the exhaust gas flowing through the honeycomb body. The invention is used, in particular, in the context of exhaust-gas purification in motor vehicles. The invention also relates to a method for producing a honeycomb body and a motor vehicle having a honeycomb body.

A multiplicity of different structures of honeycomb bodies for exhaust-gas aftertreatment have already been proposed. A basic distinction is made between ceramic and metal honeycomb bodies. Due to the simpler production process and the smaller wall thicknesses and thus the possibility of providing a larger surface area per unit of volume, metallic honeycomb bodies, in particular, have lent themselves to use for the objective set out in the introduction. A honeycomb body of that type may be constructed with smooth and/or structured metallic layers or sheet-metal foils. The metallic layers may be layered, wound and/or coiled and finally positioned in a housing of the honeycomb body, in such a way that a multiplicity of channels through which the exhaust gas can flow are formed. In that case, the channels may, for example, extend in rectilinear, wound and/or oblique form between the end sides of a honeycomb body of that type.

With the aim of obtaining the most intimate possible contact between the exhaust gas and the walls of the honeycomb body, and/or with the catalytic coating located there, measures have already been proposed which reduce a laminar flow of the exhaust gas through the honeycomb body. For example, openings may be provided in the channels walls, in such a way that intercommunicating channels are formed. It is likewise known for diverting structures, guide vanes, etc. to be provided in the channels in order to achieve targeted flow diversion in the channels, pressure differences between the channels, or the like. In that case, it must however be taken into consideration that, with an intensified diversion of the exhaust-gas flow within the honeycomb body, a pressure loss across the honeycomb body may be increased. That may lead to internal combustion engine power losses, because the back pressure thus formed can hinder the discharge of exhaust gas from the internal combustion engine.

In the field of automobile construction in particular, further demands are placed on a honeycomb body of that type, or on the production thereof. The focus is, in particular, on making the production process as inexpensive and simple as possible.

Furthermore, it must also be taken into consideration that a honeycomb body of that type is subject to considerable thermal and/or dynamic load fluctuations in a mobile exhaust system, in such a way that in that case, it is also the case that particularly high demands are placed on the durability of a honeycomb body of that type under those conditions.

SUMMARY OF THE INVENTION

It is accordingly an object of the invention to provide a honeycomb body for exhaust-gas aftertreatment (in particular in motor vehicles), a method for producing a honeycomb body and a motor vehicle having a honeycomb body, which at least alleviate or even overcome the hereinafore-mentioned disadvantages of the heretofore-known honeycomb bodies, methods and vehicles of this general type.

With the foregoing and other objects in view there is provided, in accordance with the invention, a honeycomb body for exhaust-gas aftertreatment, comprising a first end side, a second end side, a central axis that extends through both end sides, and a length. Furthermore, the honeycomb body has at least one at least partially structured metallic layer which is disposed around the central axis. The structure of the at least one metallic layer furthermore has elevations and depressions which extend at least over a part of the length of the honeycomb body and run obliquely with respect to the central axis. Furthermore, at least one metallic connecting strip is provided between adjacent regions of the at least one at least partially structured metallic layer, the at least one metallic connecting strip being shorter than the length of the honeycomb body and forming a brazed connection or welded connection to the adjacent regions.

The honeycomb body may basically take different forms, in particular a circular, oval, polygonal or similar cross section. A honeycomb body of this type is often formed with a tubular housing. In this case, during operation, the exhaust gas generally enters through one of the two end sides and exits again through the other end side. The end sides, which are preferably disposed substantially parallel to one another, generally define the length of the honeycomb body in the direction of the central axis which extends through both end sides and which is, in particular, disposed perpendicularly and centrally with respect to at least one, preferably both end sides.

The honeycomb body furthermore has at least one at least partially structured metallic layer. In this case, it is possible for a (single) metallic layer to have smooth and structured sections, or sections with different structuring. The at least one metallic layer may, for example, be disposed in the form of a spiral around a central axis. Furthermore, it is possible to use multiple metallic layers, wherein, for example, some of the layers are smooth and/or are structured differently than at least one further metallic layer. In particular, two metallic layers or a multiple thereof are used, wherein a layer pair has the same structure (type, size, etc.) but the layers are formed with different orientation so as to crisscross one another.

In this case, the structure of the metallic layer is preferably formed over the entire length, that is to say between the first end side and the second end side. The structure is formed by elevations and depressions, which are for example stamped into the metallic layer. In this case, elevations and depressions alternate at regular intervals in the profile direction of the metallic layer. In cross section, the elevations and depressions may form a type of sinusoidal corrugation, a zigzag shape or the like. The configuration of the structure and/or of the elevations and depressions in the honeycomb body is such that they run obliquely with respect to the central axis. In this way, in particular, channel sections are formed which run not parallel but obliquely with respect to the central axis. Accordingly, if an exhaust-gas flow impinges perpendicularly on an end side, the exhaust gas is initially split or divided up because it ingresses into the channel openings formed by the elevations or depressions and is then diverted in the interior of the honeycomb body. In this case, the structure is very particularly implemented in such a way that the elevations and depressions in adjacent regions (as viewed in the radial direction in relation to the central axis) are inclined differently and/or have a different orientation than one another. For example, if a diversion to the right is realized in one region, then it is preferable for a diversion to the left to be realized in the region situated further to the inside, or vice versa. It is very particularly preferable for the alignment and/or orientation to alternate constantly as viewed in a radial direction. This has the effect, in particular, that the elevations and depressions at least partially and preferably nowhere in the honeycomb body lie linearly against one another, but rather cross one another and thus form substantially only punctiform abutment points with one another. This yields a construction in which the partial exhaust-gas flows are permanently diverted and can flow into adjacent elevations and depressions, in particular in zigzag fashion.

In addition to the oblique structure, it is possible for a multiplicity of micro-fixtures (guide surfaces, studs, etc.) and/or holes to be provided on and/or in the elevations and/or depressions. It is preferable for multiple micro-fixtures and/or holes to be provided on each elevation and/or depression (as viewed in the profile direction of the elevation and/or depression).

Specifically in the case of such a construction, it is particularly difficult to form a permanent connection between the elevations and depressions of adjacent regions, because due to the tolerances during the manufacture of such metallic layers and/or deformation during the assembly process, the exact positions of the abutment points cannot always be predetermined. Furthermore, it is difficult for connecting material to be positioned retroactively at the location and/or for a uniform connection of the metallic layer(s) to be obtained over the entire honeycomb body.

For this purpose, the metallic honeycomb body furthermore has at least one metallic connecting strip which is provided between the adjacent regions and between the abutment points. It is preferable for one, two or three such metallic connecting strips to be provided. It is preferable for such a metallic connecting strip to extend over the entire cross section of the honeycomb body, that is to say, in particular, between all of the abutment points of the oblique structure in cross section. The metallic connecting strip is preferably of smooth form, that is to say has substantially no (significant and/or intentionally stamped) structure. Microstructures may however be provided which arise, for example, as a result of the assembly process or during the manufacturing process or when the adjacent structured regions are pressed on. The connecting strip accordingly offers an areal abutment facility for the then linearly abutting elevations and depressions in the longitudinal section, wherein a brazed connection or welded connection can then be formed in a targeted manner there. For example, the connecting strip may in advance be provided (over a large area) with brazing material, with connections then being made only at the respective contact regions. A permanent connection can be produced in an even more targeted manner if defined welded connections to the elevations and/or depressions of the structure are formed through the metallic connecting strip (on both sides). In this case, it may also be provided that not all elevations and/or depressions are formed with a connection, and that, instead, "free" and/or "flexible" abutment points are also provided, for example adjacently in the length segment. It is thus possible for thermal expansion behavior to be compensated by way of a restricted movement of connecting strip and metallic layer(s) (away from one another). The number of adjacent "free" and/or "flexible" abutment points between two brazed connections or welded connections may be constant or may vary. It is preferable for at least two "free" and/or "flexible" abutment points to be provided between two brazed connections or welded connections.

This consequently means in particular that, as viewed over the length of the honeycomb body, at least one length segment is formed in which adjacent regions of the layers that form the structure are permanently fixed by way of a connecting strip, whereas, in at least one other length segment, abutment points (that are not fixed in substance-to-substance fashion) are formed by direct contact between the adjacent structures.

In accordance with another preferable feature of the honeycomb body of the invention, the at least one metallic connecting strip has a width of 5 to 20 mm [millimeters]. In this case, it is very particularly preferable for the connecting strip to thus make up in each case at most one fifth, one tenth or even only one fifteenth of the actual length of the honeycomb body. In other words, this also means that the width of the metallic connecting strip should be defined parallel to the length and/or the central axis of the honeycomb body. The relatively small width of the metallic connecting strip permits particularly efficient use of the brazing and/or welding process, wherein at the same time, connecting regions can be provided in a targeted manner in accordance with the dynamic and/or thermal behavior of the honeycomb body.

In accordance with a further feature of the honeycomb body of the invention, the at least one metallic connecting strip is disposed around the central axis and at least close to one end side of the honeycomb body. It is preferable in this case for the metallic connecting strip to follow the profile of the at least one metallic layer, that is to say, in particular, to also run in spiral fashion around the central axis. It is very particularly preferable for a metallic connecting strip to be provided adjacent each end side, wherein, in particular, the number of connecting strips is thus limited to two.

In accordance with an added advantageous feature of the honeycomb body of the invention, the at least one metallic connecting strip prevents at least one at least partially structured metallic layer from coming into contact with itself, or with a further at least partially structured metallic layer, in an axial section of the honeycomb body. If the honeycomb body is, for example, formed with a single metallic structured layer, then the connecting strip prevents direct contact (at the abutment points) between adjacent regions of the layer. If multiple at least partially structured metallic layers are disposed adjacent one another (in layered form) and then wound, contact between the multiple at least partially structured metallic layers is prevented in the axial section. By contrast, direct contact of this type is provided in other axial sections of the honeycomb body (as viewed in the direction of the central axis), because no metallic connecting strips are located there.

In accordance with an additional advantageous feature of the honeycomb body of the invention, an angle between the elevations and/or depressions and the central axis is at most 20° [degrees]. It may be provided, in particular, that the angle lies in a range from 1° to 10° and very particularly preferably in a range from 2° to 6°.

The angle should, in particular, be selected in such a way that, even with this small degree of inclination, if appropriate only a small number of abutment points (preferably 2, 3, 4, 5, 6, 7, 8, 9 or 10) is created over the length of the honeycomb body, with it nevertheless being ensured that, in particular, the stability of the honeycomb structure is not adversely affected and/or the pressure forces in the region of the metallic connecting strip are not too high (which may, in particular, also lead to deformation of the connecting strip). Accordingly, it is proposed, in particular, that the angle be selected to be small if a high cell density is provided in the honeycomb body and/or if a structure is provided that has elevations and depressions situated closely adjacent one another. Accordingly, in the case of a honeycomb body with a cell density of at least 600 cpsi (cells per square inch), an angle of at most 10° is, for example, preferable. In this case, it is proposed, in particular, that the angle be set in such a way that, over the length of the honeycomb body, a maximum of 4 or even exactly only 2 abutment points are formed for one elevation/depression.

It has also been found that, with an angle of greater than 20°, an undesirably high flow resistance is generated which leads to a back pressure which can adversely affect the power characteristics of the exhaust system and of the internal combustion engine. The characteristic of the honeycomb body is further reduced if the angle is reduced. The angle can be determined, in particular, as viewed laterally and/or in the radial direction toward the central axis of the profile of the elevations and/or depressions.

This embodiment of a honeycomb body, with structures with a correspondingly small degree of inclination, may in itself constitute a significant improvement of the known honeycomb body even independently of the configuration, proposed in this case, with the metallic connecting strip. This can be described as follows: A honeycomb body for exhaust-gas aftertreatment, comprising a first end side, having a second end side, having a central axis that extends through both end sides, and having a length, the honeycomb body including at least one at least partially structured metallic layer that is disposed around the central axis, wherein the structure of the at least one metallic layer has elevations and depressions which extend at least over a part of the length of the honeycomb body and run obliquely with respect to the central axis, wherein an angle between the elevations or depressions and the central axis is at most 20°. If no metallic connecting strip is provided, it is accordingly possible for brazed connections, welded connections and/or diffusion connections to be provided at the (few) abutment points. An embodiment of the honeycomb body is particularly preferable in which precisely only 2 or 3 abutment points are provided per elevation/depression. With regard to the construction of the honeycomb body and the functions thereof, reference is made, in particular, to the explanations given above.

With the objects of the invention in view, there is also provided a method for producing a honeycomb body for exhaust-gas aftertreatment. The method comprises at least the following steps:

a) providing a structured metallic layer in band form, the structured metallic layer having a structure with elevations and depressions formed obliquely with respect to an edge of the metallic layer,
b) laying a metallic connecting strip on a subsection of a first surface of the structured metallic layer,
c) forming a welded connection between the metallic connecting strip and the structured metallic layer,
d) winding up the welded configuration composed of metallic connecting strip and structured metallic layer,
e) laying a subsection of a second surface of the structured metallic layer on the metallic connecting strip,
f) forming a welded connection between the metallic connecting strip and the structured metallic layer,
g) repeating steps b) to f) until a honeycomb structure having a multiplicity of channel openings is formed,
h) inserting the honeycomb structure into a housing, and
i) connecting the honeycomb structure to the housing.

The method which is specified in this case serves, in particular, for the production of the honeycomb body described above, wherein a welded connection is formed between the connecting strip and the at least one at least partially structured metallic layer. It is basically also pointed out herein that the explanations relating to the honeycomb body can also be applied to the method, and vice versa.

For step a), it is preferable for a metallic layer to be provided which has already had a structure imparted to it. Normally, smooth sheet-metal foils in band form provided in spiral form on a winding are initially subjected to a deformation step, for example a corrugation rolling process, for the purpose of forming the structure. In this case, a structure is selected which does not extend perpendicularly from the edge of the metallic layer in band form but is oriented obliquely with respect to the edge, that is to say, in particular, at an angle of preferably at most 20° with respect to the normal to the edge. In this case, it is very particularly preferable for the elevations and depressions to extend parallel to one another and over the entire length of the honeycomb body thus formed, in such a way that, in particular, no unstructured regions exist in the metallic layer in band form.

Then, in step b), a metallic connecting strip is laid in (only) a subsection of a first surface of the structured metallic layer. Since the metallic connecting strip is preferably smooth, it accordingly lies, for example, only on the elevations of the top side (first surface).

Subsequently, in step c), welded connections are formed between the metallic connecting strip and the structured metal layer. In this case, the formation of the welded connection is preferably performed only from one side of the configuration, for example by virtue of the welded connection being formed through the metallic connecting strip, to the metallic layer disposed behind the metallic connecting strip, from the outside.

The configuration of metallic connecting strip and structured metallic layer, having already been welded to one another, is then (partially) wound together (step d)) in such a way that a configuration of the structured metal layer around a central axis of a honeycomb body is gradually realized.

In particular, during the winding-up process, a (different) subsection of a second surface of the structured metallic layer is laid on the metallic connecting strip (step e)) (at a different point of the constructed honeycomb body). In other words, this means in particular that, then, for example, an underside (second surface) of the structured metallic layer is also laid on (the metallic connecting strip that has already been connected on one side) as a result of the winding process.

In step f), a welded connection is then (also) formed between the metallic connecting strip and the structured metallic layer, in particular the second surface. Welded connections are thus formed on both sides of the connecting strip, to the adjacent surfaces (top side/bottom side) of the structured metallic layer. In this way, the metallic connecting strip, by way of its welded connections to the adjacent regions of the structured metallic layer, fixes the configuration of the honeycomb body.

It is preferable in this case for a form of intermittent winding-up process to be performed, wherein during the winding-up process as per step d), steps b) and e) are (inevitably and/or automatically) performed simultaneously, and in short pauses in the winding-up process, the welded connections as per steps c) and f) are formed (simultaneously) at different locations. Steps b) to f) are consequently performed repeatedly until a honeycomb structure with a multiplicity of channel openings has finally been formed. A honeycomb body, in particular for use in the automotive sector, preferably has a diameter of 90 mm to 120 mm, wherein the structure height of the structured metallic layer lies, for example, in the range from 1.5 mm to 3 mm. Consequently, a multiplicity of windings of this type may be formed until the honeycomb body has been produced with the desired dimensions.

The structural metallic layer and/or the connecting strip may then if appropriate be severed, wherein this process may be followed by the winding-up of the remaining section.

The honeycomb structure thus prepared may then be inserted into a housing in step h). It is preferable in this case for the honeycomb structure to be entirely surrounded by a housing, in particular by a tubular housing.

In a subsequent process, it is then possible for a further connection to be formed between the honeycomb structure and housing, for example likewise in the manner of a welded connection or in the manner of a brazed connection.

The honeycomb body thus prepared may subsequently undergo further processes, for example thermal treatments, coating processes, etc.

In accordance with another preferable mode of the method of the invention, the process of roll seam welding or laser welding is performed in steps c) and f). For the roll seam welding, it may be necessary for the configuration composed of metallic connecting strip and structured metallic layer to be supported. During the roll seam welding process, an electrical current is passed locally through the metallic foils, wherein the weld seam is formed due to the contact pressure and the associated generation of heat. In the laser welding process, a laser beam is directed locally onto the metallic sheet-metal foils, wherein in this case, a weld seam is likewise formed due to the generation of heat.

In accordance with a further preferable mode of the method of the invention, in steps c) and f), connections are made in each case only to a depression or to an elevation of the structured metallic layer. If, in step b), the metallic connecting strip is laid, for example, onto a top side of the structured metallic layer, the metallic connecting strip is only in contact with the elevations, in such a way that there, welded connections are actually also formed only between the elevations and the structured metallic layer. Then, during the winding-up process, another subsection of the metallic layer is laid on from the opposite side, in such a way that the connecting strip is then placed in contact with the underside, and/or with the depressions. At this juncture, and/or during step f), a welded connection is then, for example, formed only between depressions and the metallic connecting strip situated behind the metallic connecting strip.

With the objects of the invention in view, there is concomitantly provided a motor vehicle, comprising an internal combustion engine with an exhaust system, the exhaust system having at least one catalyst carrier or a particle separator that is formed with a honeycomb body as described herein. In this case, the catalyst carrier and/or the particle separator may have a catalytically active coating, which may if appropriate also be configured differently in axial subsections of a honeycomb body.

The invention has the effect, in particular, that the always numerous and elongate wedges or angles between the structures in the case of a straight orientation are reduced, whereby, for the same cell density of the honeycomb body, a greater surface area can be provided and undesired accumulations of washcoat (or of some other coating) in the wedges or angles can be reduced.

Other features which are considered as characteristic for the invention are set forth in the appended claims, noting that the description includes further explanations and features that may be combined with the features of the claims in any desired technologically meaningful manner, and specifies further embodiments of the invention.

Although the invention is illustrated and described herein as embodied in a honeycomb body for exhaust-gas aftertreatment, a method for producing a honeycomb body and a motor vehicle having a honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
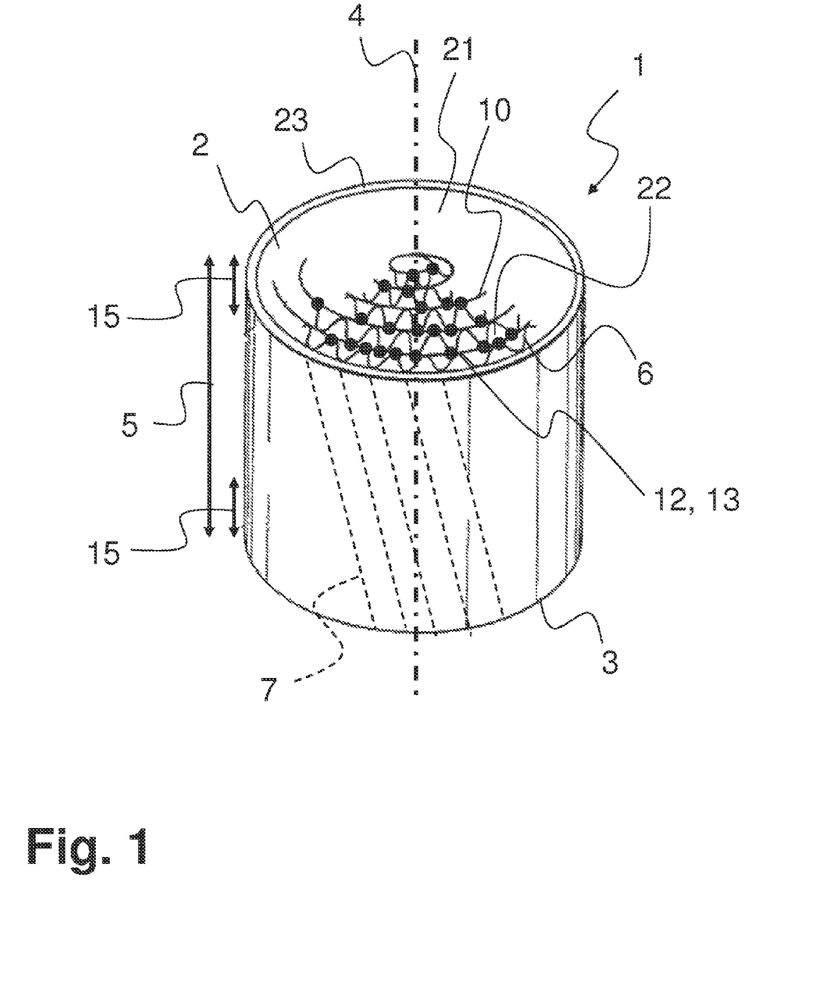
FIG. 1 is a diagrammatic, perspective view of a honeycomb body for exhaust-gas aftertreatment.

Referring now to the figures of the drawings in detail and first, particularly, to FIG. 1 thereof, there is seen a diagrammatic and partially perspective view of a honeycomb body 1 for exhaust-gas aftertreatment. The honeycomb body 1 has a first end side 2 (in this case illustrated at the top) and a second end side 3 (indicated at the bottom). In this case, the first end side 2 and the second end side 3 are disposed substantially parallel to one another and have a substantially circular cross section. The honeycomb body 1 furthermore has a central axis 4 which runs centrally through the first end side 2 and through the second end side 3 and extends perpendicularly therethrough. The (cylindrical) honeycomb body 1 furthermore has a length 5 which practically corresponds to the spacing between the first end side 2 and the second end side 3.

The honeycomb body 1 has two main constituent parts, specifically firstly a housing 23, which in this case is of cylindrical, tubular form, and secondly a honeycomb structure 21, which is positioned therein. The honeycomb structure 21 and the housing 23 are connected to one another by a cohesive or substance-to-substance connection. The expression "cohesive" or "substance-to-substance" connection refers to all connections in which the connecting partners are held together by atomic or molecular forces. They are generally, at the same time, non-releasable connections which can be severed only by destruction of the connections (in particular brazed connections, welded connections, diffusion connections).

In this case, the honeycomb structure 21 is formed with a structured metallic layer 6 which is disposed (in spiral form) around the central axis 4. The metallic layer 6 has a structure 7 which is formed with elevations and depressions that alternate in the profile direction of the metallic layer 6. In this case, the orientation of the structure 7 is indicated by dashed lines, because the structure is concealed by the housing 23 that is illustrated. The dashed lines however indicate that the profile of the structure 7 (and/or of the elevations and/or depressions) is formed obliquely with respect to the central axis 4. The layout or configuration of the metallic layer 6 has the effect that the entire cross section, and/or the end sides of the honeycomb body, is/are divided up, specifically into a multiplicity of channel openings 22 through which the exhaust gas can enter and exit. In this case, this dividing-up can be assumed to be realized (only) in the channel openings 22 because no (fully) separate flow guidance in separate channels is realized in the interior region of the honeycomb structure 21. Rather, after entering through the channel openings 22, the exhaust gas, on the path through the honeycomb structure, will repeatedly impinge on transversely and/or obliquely oriented elevations and depressions, and thus be deflected. Thus, a partial exhaust-gas flow comes into contact with multiple or even a multiplicity of different elevations and/or depressions as it travels through the honeycomb structure 21. This promotes intimate contact between the exhaust gas and the metallic layer 6 and/or catalytically active material which is provided and located there at a later point in time.

Furthermore, FIG. 1 illustrates that respective connecting strips 10 are provided in axial sections 15 respectively adjacent the first end side 2 and the second end side 3. As indicated therein, the connecting strips 10 are positioned in the honeycomb structure 21, together with the metallic layer 6, (in spiral form) around the central axis 4. In this case, it is (entirely) in the axial section 15 that the connecting strip 10 forms brazed connections 12 or welded connections 13 to the structures, adjacent on both sides, of the metallic layer 6.

Figure 2:
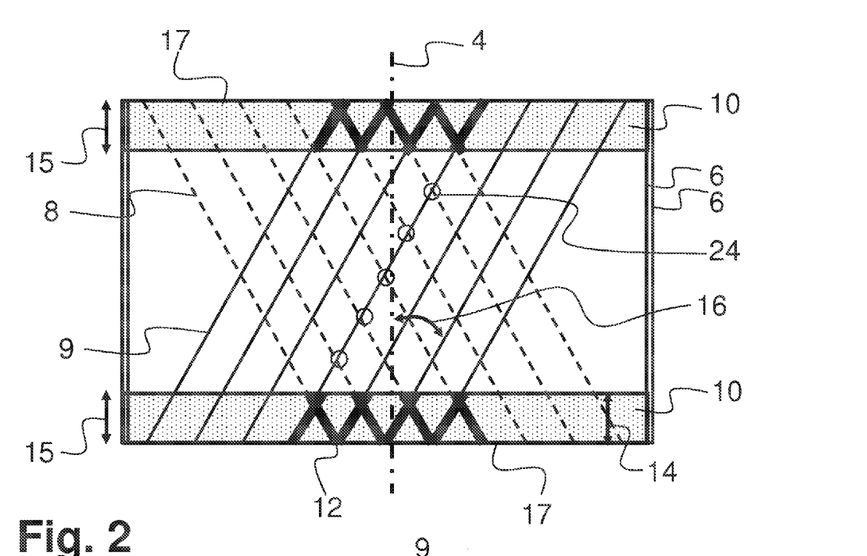
FIG. 2 is a plan view of an unwound, layered configuration of a structured metallic layer and of a metallic connecting strip.
Figure 3:
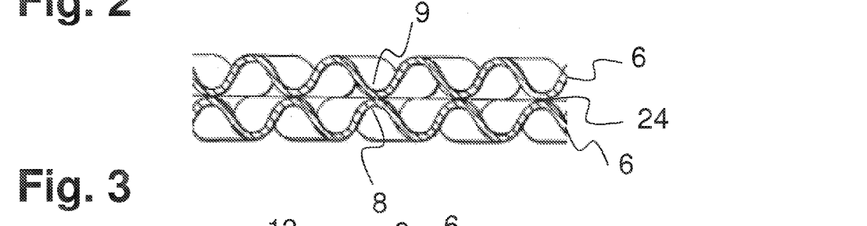
FIG. 3 is a cross-sectional view of a layered construction of the structured metallic layer, with abutment points being formed.
Figure 4:
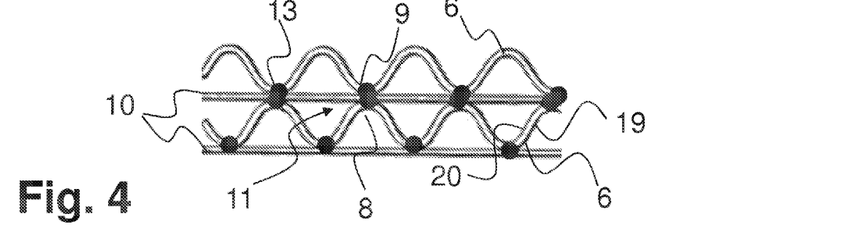
FIG. 4 is a cross-sectional view of a layered construction of structured metallic layers and connecting strips, with connections having been formed.

FIGS. 2, 3 and 4 are intended to illustrate the internal construction and/or the abutment situations between the metallic layer(s) 6 and the connecting strip 10. For this purpose, an unwound configuration of the components has been shown therein. Accordingly, FIG. 2 diagrammatically shows two sections, disposed one above the other, of a metallic layer 6, in which these sections each have elevations 8 and depressions 9 which are disposed parallel to one another and which extend between two edges 17. It can be seen that, in the case of the metallic layer 6 illustrated on top, the elevations 8 and depressions 9 run from bottom left to top right, whereas in the case of the metallic layer 6 disposed underneath, the elevations 8 and depressions 9 run in an opposite orientation, that is to say from bottom right to top left. It should be noted in this case that, for clarity, in the case of the top metallic layer 6, only the depressions 9 are illustrated, and in the case of the metallic layer 6 illustrated underneath, only the elevations 8 are illustrated (by dashed lines), in order to be able to visually depict the abutment situation. Therefore, outside the axial sections 15 adjoining the edge 17, contact points exist between the depressions 9 of the metallic layer 6 positioned on top and the elevations 8 of the metallic layer 6 positioned underneath, only at discrete abutment points 24. In order to ensure that abutment points 24 which provide adequate stabilization and support are formed in this case, an angle 16 between the central axis 4 (or an axis perpendicular to the edge 17) and the profile of the elevations/depressions should be selected to be in the range of up to 20°. In this case, a relatively large angle is preferable, in particular, if the length of the honeycomb structure (and/or the spacing between the two edges 17) and/or the cell density is low.

FIG. 3 illustrates, by way of example, the abutment situation of the metallic layers 6 disposed directly adjacent one another. The depressions 9 of the metallic layer 6 illustrated on top form direct abutment points 24 with the elevations 8 of the metallic layer 6 illustrated underneath, in such a way that the two structures or metallic layers 6 are (directly) supported on one another. Even though seven abutment points 24 are indicated in this case per elevation/depression, the number may be lower (for example 2, 3, 4 or 5). This arises, in particular, if the angle 16, which in this case is selected to be relatively large for the purposes of the diahrammatic illustration, is smaller.

As is seen in FIG. 2, close to the edges 17 (and then close to the end sides of the honeycomb body), there is provided an axial section 15 in which in each case one metallic connecting strip 10 is positioned between the metallic layers 6. In this case, in general, the axial section 15 is defined directly by a width 14 of the connecting strip 10. In this case, the connecting strip 10 now forms not only punctiform contact regions with respect to the adjacent metallic layers 6 but preferably lines of contact running substantially over the entire width 14. It is then possible, for example, for brazed connections 12 to be formed along the lines of contact.

A similar situation is illustrated in FIG. 4, wherein the figure shows, in particular, a cross section through the axial section 15. It can be seen in this case that direct contact between the adjacent metallic layers 6, by way of the elevations 8 and depressions 9, is prevented because a connecting strip 10 is provided in between. A cohesive or substance-to-substance connection is then formed between the elevations 8 and/or depressions 9 and the connecting strip 10, for example by way of welded connections 13. Welded connections 13 are accordingly provided in adjacent regions 11 of the structured metallic layer 6. These welded connections 13 are formed between the connecting strip 10 and a first surface 19 of the metallic layer 6 on one side, and between the connecting strip 10 and a second surface 20 of a metallic layer 6 on the other side.

Figure 5:
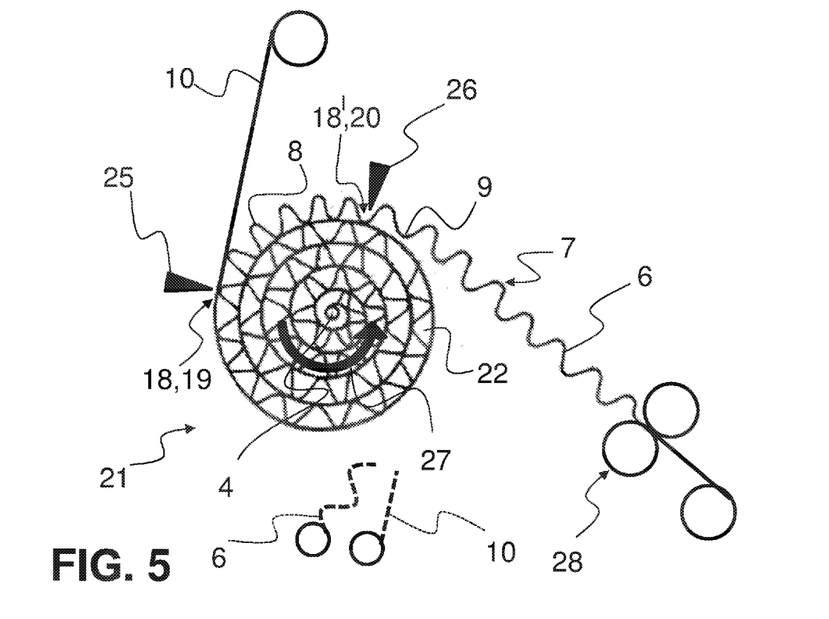
FIG. 5 is a cross-sectional view diagrammatically showing a production process for a honeycomb body of this type.

FIG. 5 diagrammatically shows the progression of a production process for a honeycomb body 1 of this type for exhaust-gas aftertreatment. In this case, the illustration shows, in particular, a process for the continuous manufacture of the honeycomb structure 21 using a single metallic layer 6, although it is generally also possible for multiple metallic layers 6 to be used in a corresponding manner for the construction of the honeycomb structure 21 (as indicated by dashed lines). In this case, it is clear that, in particular if it is sought to realize intersecting elevations/depressions in the construction, the structure 7 of the metallic layer 6 is correspondingly adapted, or the structures of multiple metallic layers are configured correspondingly.

The explanation begins at the bottom right of FIG. 5, where there is illustrated, for example, a coil (winding) from which sheet-metal material in band form is drawn off and supplied to a corrugation tool 28. There, the metallic layer 6 has the desired structure 7 with elevations 8 and depressions 9 imparted to it. The structured metallic layer 6 is then fed to a second welding position 26, where a second subsection 18' is laid by way of a second surface 20 of the structured metallic layer 6 onto the already coiled metallic connecting strip 10. The depression 9 is then connected (by way of a welded connection) to the connecting strip 10. If the honeycomb structure 21 is then wound up further by virtue of the honeycomb structure 21 being rotated about the central axis 4 in a direction of rotation 27, the elevations 8 of the structure 7 of the metallic layer 6 subsequently come into contact with the metallic connecting strip 10, which is laid thereon. The metallic connecting strip 10 thus makes contact with a first subsection 18 of the first surface 19 of the metallic layer 6. After this has taken place, and as a result of further winding-up of the honeycomb structure 21, a first welding position 25 is reached, where the connecting strip 10 is welded to the elevations 8 of the metallic layer 6.

Figure 6:
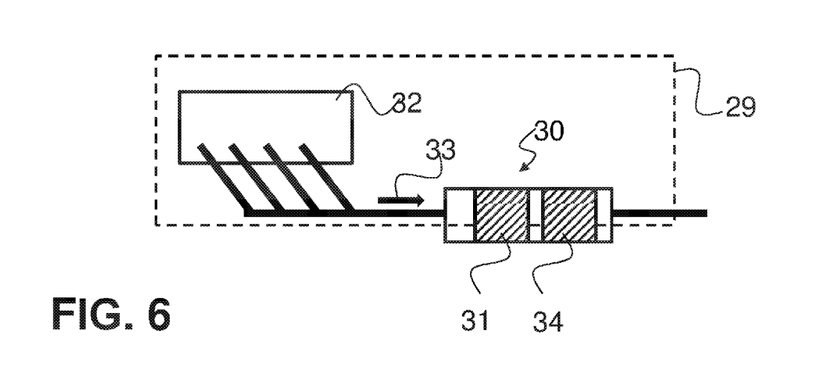
FIG. 6 is a block diagram of an exhaust system of a motor vehicle.

Finally, in order to provide an explanation of the technical context, reference is also made to the field of use for this type of a honeycomb body for exhaust-gas aftertreatment, as shown in FIG. 6. The figure schematically shows a motor vehicle 29 having an internal combustion engine 32. The exhaust gas produced in the internal combustion engine 32 is conducted in a flow direction 33 through an exhaust system 30. Exhaust-gas aftertreatment is performed in the exhaust system 30 in such a way that the exhaust gas is purified with regard to pollutants and/or particles. In this case, the figure shows by way of example a catalyst carrier 31 and a particle separator 34, which are each part of the exhaust system 30 and through which the exhaust gas is conducted. A catalyst carrier 31 or particle separator 34 of this type may be provided by using the honeycomb body described herein and/or the method described herein.

With regard to the explanation of the figures, it is also pointed out that the respectively illustrated features may also be combined with features from other figures unless this is clearly technically not possible and/or explicitly ruled out in this case.

The invention claimed is:

1. A honeycomb body for exhaust-gas aftertreatment, the honeycomb body comprising:
   a length, a first end side, a second end side and a central axis extending through said first and second end sides;
   at least one at least partially structured metallic layer disposed around said central axis, said at least one at least partially structured metallic layer having a structure with elevations and depressions extending at least over a part of said length and running obliquely relative to said central axis, and said at least one at least partially structured metallic layer having adjacent regions;
   at least one metallic connecting strip being separate from said at least one at least partially structured metallic layer, being disposed between said adjacent regions, having a width of 5 to 20 mm and being shorter than said length; and
   a brazed connection or welded connection formed between said at least one metallic connecting strip and said adjacent regions.

2. The honeycomb body according to claim 1, wherein said at least one metallic connecting strip is disposed around said central axis and is at least close to one of said end sides.

3. The honeycomb body according to claim 1, wherein said at least one metallic connecting strip prevents said at least one at least partially structured metallic layer from coming into contact with itself or with a further at least partially structured metallic layer in an axial section of the honeycomb body.

4. The honeycomb body according to claim 1, wherein said elevations or said depressions and said central axis enclose an angle therebetween of at most 20°.

5. The honeycomb body according to claim 1, wherein said at least one at least partially structured metallic layer includes two at least partially structured metallic layers being separate from and disposed on top of each other, and said elevations and depressions of each of said two at least partially structured metallic layers run in different respective directions obliquely relative to said central axis.

6. The honeycomb body according to claim 1, wherein said at least one metallic connecting strip includes two metallic connecting strips each being disposed at a respective one of said end sides.

7. The honeycomb body according to claim 6, wherein said two metallic connecting strips each have a width equal to at most one fifth of said length of the honeycomb body.

8. A motor vehicle, comprising:
   an internal combustion engine; and
   an exhaust system associated with said internal combustion engine, said exhaust system having at least one catalyst carrier or particle separator formed with a honeycomb body according to claim 1.

9. A method for producing a honeycomb body for exhaust-gas aftertreatment, the method comprising the following steps:
   a) providing a band-shaped, structured metallic layer having an edge and a structure with elevations and depressions formed obliquely relative to said edge;
   b) laying a metallic connecting strip, having a width of 5 to 20 mm and being separate from the structured metallic layer, on a subsection of a first surface of the structured metallic layer;
   c) forming a welded connection between the metallic connecting strip and the structured metallic layer;
   d) winding up the welded metallic connecting strip and the structured metallic layer;
   e) laying a subsection of a second surface of the structured metallic layer on the metallic connecting strip;
   f) forming a welded connection between the metallic connecting strip and the structured metallic layer;
   g) repeating steps b) to f) until a honeycomb structure having a multiplicity of channel openings is formed;
   h) inserting the honeycomb structure into a housing; and
   i) connecting the honeycomb structure to the housing.

10. The method according to claim 9, which further comprises performing a roll seam welding or laser welding process in steps c) and f).

11. The method according to claim 9, which further comprises forming connections in each case only to a depression or only to an elevation of the structured metallic layer, in steps c) and f).

12. The method according to claim 9, which further comprises winding another structured metallic layer onto the metallic connecting strip and the structured metallic layer.

13. The method according to claim 12, wherein the elevations and depressions of each of the structured metallic layers run in different respective directions obliquely relative to the edge of a respective structured metallic layer.

14. The method according to claim 9, which further comprises winding another metallic connecting strip on a different subsection of the structured metallic layer, the metallic connecting strips each having a width equal to at most one fifth of a length of the honeycomb body.

15. The method according to claim 12, which further comprises winding another metallic connecting strip on a different subsection of the structured metallic layers, the other metallic connecting strips each strip having a width equal to at most one fifth of the length of the honeycomb body.

16. A honeycomb body for exhaust-gas aftertreatment, the honeycomb body comprising:
a length, a first end side, a second end side and a central axis extending through said first and second end sides;
at least one at least partially structured metallic layer disposed around said central axis, said at least one at least partially structured metallic layer having a structure with elevations and depressions extending at least over a part of said length and running obliquely relative to said central axis, and said at least one at least partially structured metallic layer having adjacent regions;
at least one metallic connecting strip being separate from said at least one at least partially structured metallic layer, being disposed between said adjacent regions, having a width equal to at most one fifth of said length of the honeycomb body and being shorter than said length; and
a brazed connection or welded connection formed between said at least one metallic connecting strip and said adjacent regions.

17. A method for producing a honeycomb body for exhaust-gas aftertreatment, the method comprising the following steps:
a) providing a band-shaped, structured metallic layer having an edge and a structure with elevations and depressions formed obliquely relative to said edge;
b) laying a metallic connecting strip having a width equal to at most one fifth of a length of the honeycomb body and being separate from the structured metallic layer, on a subsection of a first surface of the structured metallic layer;
c) forming a welded connection between the metallic connecting strip and the structured metallic layer;
d) winding up the welded metallic connecting strip and the structured metallic layer;
e) laying a subsection of a second surface of the structured metallic layer on the metallic connecting strip;
f) forming a welded connection between the metallic connecting strip and the structured metallic layer;
g) repeating steps b) to f) until a honeycomb structure having a multiplicity of channel openings is formed;
h) inserting the honeycomb structure into a housing; and
i) connecting the honeycomb structure to the housing.

* * * * *